Feb. 16, 1937. R. HAFNER 2,070,657
ROTATIVE WING AIRCRAFT
Filed Nov. 8, 1934 2 Sheets-Sheet 1
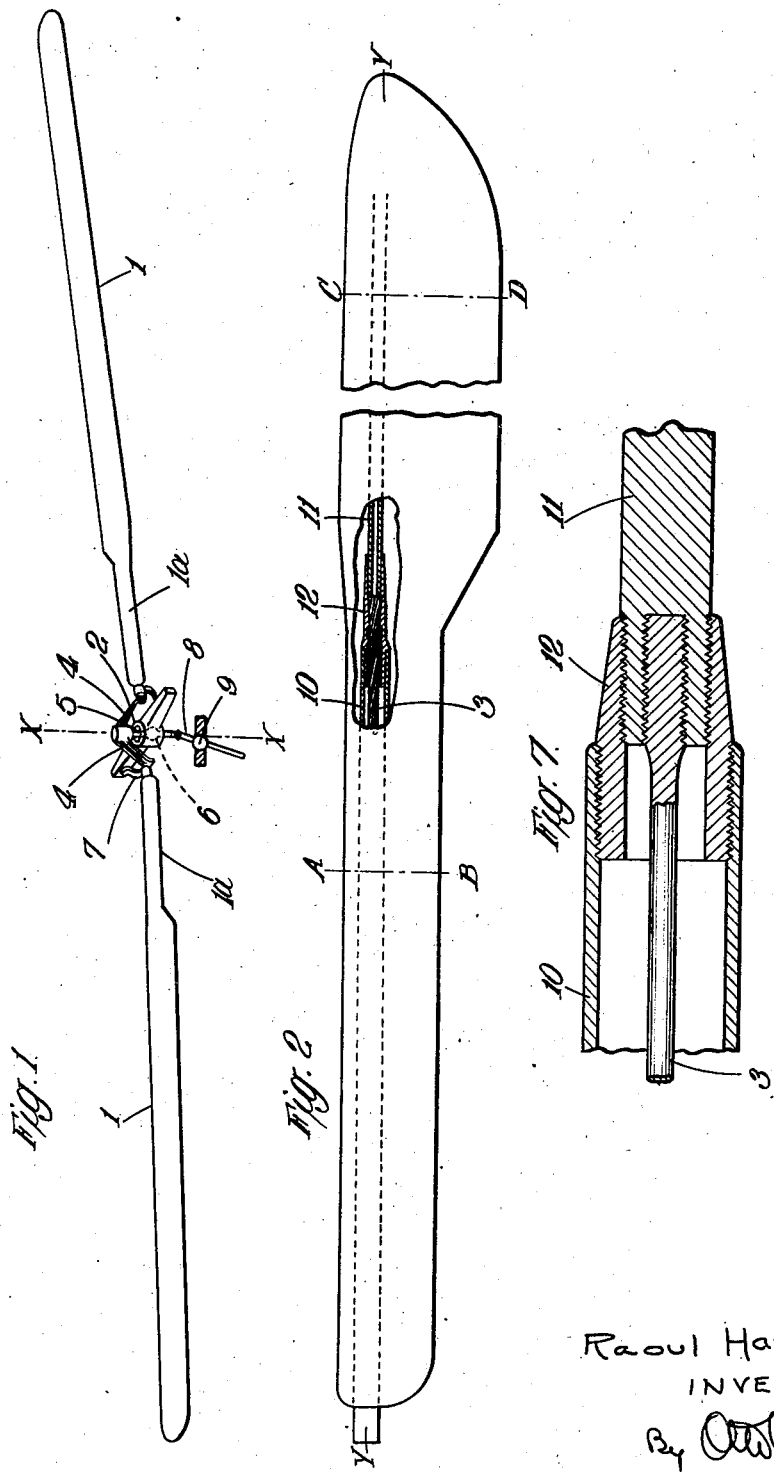
Raoul Hafner
INVENTOR
his ATTY.

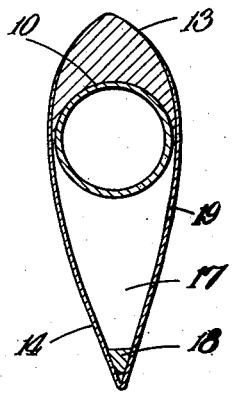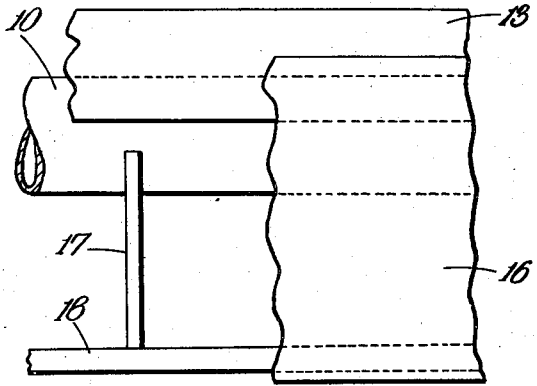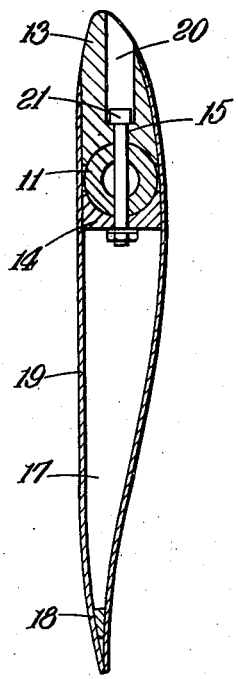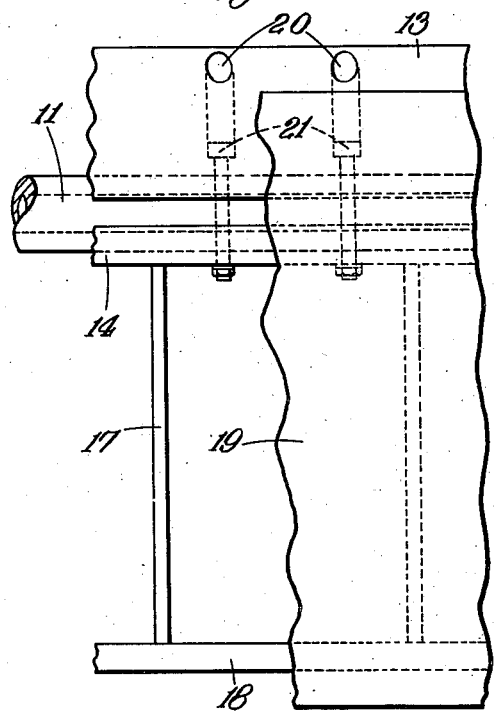

Patented Feb. 16, 1937

2,070,657

UNITED STATES PATENT OFFICE 2,070,657

ROTATIVE WING AIRCRAFT

Raoul Hafner, Vienna, Austria

Application November 8, 1934, Serial No. 751,977
In Great Britain November 9, 1933

12 Claims. (Cl. 244—18)

The present invention relates to rotative wing aircraft, that is to any aircraft comprising a system of supporting surfaces or blades rotative about a vertical or approximately vertical axis. Such aircraft may be stabilized by mounting the blades in such a way as to be capable of flapping up and down at right-angles to the plane of rotation and they may be controlled by varying the angle of the blades either differentially or as a whole.

If the blades of such aircraft are set at a negative angle to the direction of rotation, the wing system auto-rotates and the machine functions as a windmill plane, and, conversely, if the blades are set at a positive angle the wing system requires power to drive it and the machine functions as a helicopter giving a positive lift independently of lateral motion. Means may be provided for reversing the angle or pitch of the blades as a whole to enable a helicopter to be instantly converted into a windmill plane and vice versa.

When such aircraft are functioning as helicopters however, the torque necessary to drive the rotative system is balanced by an opposite torque set up in the body unit. The provision of this opposite torque which is of course of a varying nature is a matter of difficulty and a source of inefficiency.

It has been proposed to rev up to normal speed the wing system of windmill planes, while standing on the ground, by means of suitable auxiliary gears from the engine or engines driving the propeller airscrew or airscrews. This auxiliary gear is declutched from the rotative wing system before the machine takes the air so that no torque is thrown upon the body unit. It has also been proposed to augment centrifugal force by loading the extremity of a wing, and to adjust the weight and centre of gravity by the same means.

The primary object of this invention is to enable a rotative wing aircraft which functions normally as a windmill plane to function also as a helicopter for a short time without setting up a counter torque in the body, thereby to enable such a machine to take off and land vertically, that is, without appreciable lateral motion.

According to this invention rotative wing aircraft having flapping blades and means for varying or reversing the angle or pitch of the blades either differentially or as a whole are provided with blades which are loaded or have their centre of mass towards their outer extremities as far removed from the axis of rotation as convenient so as to give them a large radius or gyration and which have a section with a good lift drag ratio and a low resistance when at zero or small inclination such as a symmetrical section. Means may be provided for speeding up the blades above their normal revolutions to enable the machine to function for a time as a helicopter by utilizing the kinetic energy stored in the rotative system.

Any aircraft comprising a system of supporting surfaces or blades rotative about a vertical or approximately vertical axis, as set forth in Patent No. 385,101 and patent applications Nos. 8,555/33; 11,991/33; 23,645/33; 23,646/33, may be provided with blades of low resistance, or symmetrical section having their centre of weight at a large radius, any suitable declutchable means for driving the blades when the machine is resting on the ground, and any suitable known irreversible control device for operating the mechanism controlling the pitch or inclination of the blades, whereby the control mechanism will remain in any adjusted position without throwing further strain upon the pilot.

The blades are preferably provided with frictionless suspension as set forth in the above mentioned patent or patent applications, and are weighted so that when speeded up to 40% above their normal auto-rotating speed they will store enough kinetic energy to keep the machine in the air for five seconds.

The invention will now be described with reference to the accompanying drawings, wherein:—

Figure 1 is a general view of the wing system of a machine incorporating the invention.

Figure 2 is a plan in part section of one of the blades.

Figures 3, 4, 5 and 6 show details of construction of the blades to an enlarged scale, Figure 3 being a section on line A—B and Figure 5 a section on line C—D, Figure 2.

Figure 7 shows a modified detail.

A rotary wing machine is provided with flapping blades 1 which are suspended against centrifugal force from the rotating hub 2 by a torsionally flexible member 3.

The angle or pitch of the blades either differentially or as a whole may be varied by means of a spider 4 mounted on the end of a shaft 5 which is mounted on a ball joint 6 on the axis X—X of the hub 2. The spider 4 operates upon the ends of the radial arms 7 which are fixed to the roots 1a of the blades 1. The shaft 5 is controlled from the cockpit by an irreversible control lever 8 which is universally connected at 9 to the body of the machine.

Each blade 1 is provided with a central tubular member, concentric with the blade axis Y—Y, formed of two tubes 10, 11 connected together by a member 12 which is directly attached to the hub 2 by the enlarged head of the flexible member 3. The tube 10 which is nearer the root has a greater diameter and is relatively light in weight, and the tube 11, which carries the main surface of the blade is of small diameter and relatively heavy.

The tubes 10, 11 form a spar upon which the main surface of the blade is built. The forward portion 13 of the blade section and a small portion 14 behind the tubular spar 11 are of solid wood and are clamped together by bolts 15 through the neutral axis of the spar.

The forward portion 13 is preferably of heavy wood to form a counterweight to the structural weight of the larger portion 16 of the section behind the spar. Ribs 17 of appropriate section are glued to the rear portion 14. The outer ends of these ribs 17 are connected together by a trailing edge 18. The skeleton rear section so formed is covered with plywood 19. The plywood covering may be carried forward over the front portion of the section.

The blades may be trimmed by placing weights in holes 20 formed in the front portion 13 to accommodate the heads 21 of the bolts 15. After the weights have been fixed in position the holes 20 are plugged and the blade is covered with fabric for protection and doped in the usual manner.

The tips and the roots of the blades may be modified in any suitable way to secure aerodynamical efficiency.

In the modification shown in Figure 7 the connecting member 12 is screwed into the tube 10 and the tube or rod 11 is screwed into the member 12. The flexible member 3 is likewise screwed into the tube or rod 11.

The blades for such aircraft preferably have the following additional properties:—

(a) A stable cross section in which the centre of pressure remains constant or moves through a small distance in the stabilizing direction, such as N. 60 R. (See National Advisory Committee for Aeronautics technical report No. 355.)

(b) A thickness of cross section as low as possible especially towards the tip and thickened towards the root to support the bending movement caused by the weight of the blade at rest.

(c) The masses of the blades concentrated close to the blade axis to secure a minimum moment of inertia about the said axis.

(d) The masses of the blades along their length are proportional to an amount which lies between a value proportional to the chord and a value proportional to the product of this value with the distance from the main axis of the machine, to obtain minimum bending stresses during rotation, yet in order to obtain a high moment of inertia around the rotor axis the masses should be concentrated towards the blade tip, therefore an optimum effect lies between these two desiderata.

In taking off, the pitch of the blades is so adjusted that the weight upon the wheels will not be reduced by the rotation of the blades, which are run up to a speed about 40% above their normal speed. The pitch control is then altered to make use of the stored kinetic energy to give a helicopter effect lasting until this stored energy is consumed. During this period the machine is lifted vertically off the ground and if the propeller is thrown into gear with the engine the machine acquires speed to enable it to fly as a windmill plane. Similarly in landing, there is sufficient energy stored in the rotating structure to give a helicopter effect to break the speed of descent and to enable the machine to settle on to the ground with all the energy dissipated.

What I claim and desire to secure by Letters Patent of the United States is:—

1. Rotative wing aircraft including in combination a hub member, flapping blades each secured in radial relation to said hub by radially extending torsionally flexible tension means lying wholly within the blade and fixed thereto at a point substantially midway of its length and carrying the entire centrifugal load of said blade to permit and facilitate alteration of its angle of incidence, said blades having their centers of mass towards their outer extremities to facilitate the storage therein of kinetic energy, driving means for positively rotating the said blades while the aircraft is grounded, the blade sections having a low drag when at a small angle of incidence to facilitate their attaining an abnormally high rate of revolution and storing excess kinetic energy when so driven, and means for thereafter increasing the incidence of said blades to cause the aircraft to lift without forward run by virtue of said excess energy.

2. Rotative wing aircraft according to claim 1, comprising blades the center of pressure of whose section remains substantially stationary with changes in incidence.

3. Rotative wing aircraft according to claim 1, comprising blades the center of pressure of whose section moves forward when incidence decreases and back when it increases.

4. Rotative wing aircraft including in combination a hub member, flapping wings secured in radial relation to the hub, each of said wings including a radially extending torsionally flexible tensioning means secured at its inner end to said hub, and a blade having its longitudinal axis substantially parallel with the axis of said tensioning means, said blade being secured at a point intermediate of its length to the outer end of said tensioning means and said tensioning means carrying substantially the entire centrifugal load caused by the rotation of said parts about the axis of said hub.

5. A blade structure for rotative wing aircraft including a torsionally flexible tensioning means and a blade secured to said tensioning means solely at a point intermediate of the length of said blade, the tensioning means being enclosed within the blade structure, said tensioning means carrying the entire centrifugal load of said blade.

6. A tensioning means for a blade structure for rotative wing aircraft including a spar comprising a tubular casing and a coaxial tube coupled thereto at one end thereof, a torsionally flexible tensioning means extending from the root of said blade through said tubular casing and secured to said coaxial tube, said tensioning means being secured to said blade solely at a point intermediate of its length and lying entirely within the blade structure.

7. A tensioning means for a blade structure for rotative wing aircraft including a spar comprising a tubular casing and a coaxial tube coupled thereto at one end thereof, a torsionally flexible tensioning means extending from the root of said blade through said tubular casing and secured to said coaxial tube, said tensioning means being secured to said blade solely at a point intermediate of its length and lying entirely within the blade structure, said casing, tube and tensioning means being coaxial with the axis of the blade.

8. Blade structure for rotative wing aircraft including in combination a blade member, coaxial tubes of different diameters coupled together within said blade structure, a torsionally flexible tensioning means therein having a portion thereof extending through one of said tubes to the root of said blade, the other end thereof being secured to the other of said tubes, the arrangement of said tubes in the blade being such that the tube adjacent the root has a greater diameter than that to which the tensioning member is secured, the blade being secured to said tensioning means at a point intermediate of its length whereby the blade may be constructed in a manner so as to produce a structure which is stiff but light at the root and thin but heavy towards the tip thereof.

9. Rotative wing aircraft comprising in combination a hub member, blades constructed and arranged for flapping movement and having pitch change means, said blades being secured in radial relation to said hub, control means for rocking said blades simultaneously to change their pitch over a range including the no-lift pitch angle, and driving means for accelerating said blades from rest to a rotary speed in excess of that of their normal autorotation, a main stress-carrying part of each blade comprising a spar having towards the root a greater depth but less weight per unit length than intermediately in its span and towards the tip.

10. Rotative wing aircraft comprising in combination a hub member, blades constructed and arranged for flapping movement and having pitch change means, said blades being secured in radial relation to said hub, control means for rocking said blades simultaneously to change their pitch over a range including the no-lift pitch angle, and driving means for accelerating said blades from rest to a rotary speed in excess of that of their normal autorotation, each blade having a metal spar therein, said spar having towards the root thereof a greater diameter but a thinner wall and less weight per unit length than intermediately in its span and towards the tip.

11. Rotative wing aircraft according to claim 10, wherein each blade is anchored to said hub against centrifugal force solely by tie means torsionally flexed by changes in blade pitch.

12. Rotative wing aircraft according to claim 10, wherein each blade has an aerofoil section whose lift/drag ratio and resistance at the no-lift pitch angle are not substantially less and greater respectively than those of the section known as N. 60 R.

RAOUL HAFNER.